(12) United States Patent
Vora et al.

(10) Patent No.: US 10,699,308 B1
(45) Date of Patent: Jun. 30, 2020

(54) PREVENTING COLLECTION OF SENSITIVE INFORMATION BY ADVERTISERS USING TARGETING CRITERIA

(71) Applicant: Facebook, Inc., Menlo Park, CA (US)

(72) Inventors: Ami Vora, San Francisco, CA (US); Mark Rabkin, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 757 days.

(21) Appl. No.: 13/693,240

(22) Filed: Dec. 4, 2012

(51) Int. Cl.
*G06Q 30/02* (2012.01)

(52) U.S. Cl.
CPC ..... *G06Q 30/0269* (2013.01); *G06Q 30/0241* (2013.01); *G06Q 30/0251* (2013.01); *G06Q 30/0255* (2013.01)

(58) Field of Classification Search
CPC ........... G06Q 30/0241; G06Q 30/0251; G06Q 30/0255; G06Q 30/0269
See application file for complete search history.

(56) References Cited

U.S. PATENT DOCUMENTS

| 7,325,136 | B2 * | 1/2008 | Alldredge | 713/171 |
| 2007/0016918 | A1 * | 1/2007 | Alcorn | G06F 17/30743 725/22 |
| 2008/0077581 | A1 * | 3/2008 | Drayer | G06F 16/9535 |
| 2011/0022461 | A1 * | 1/2011 | Simeonov | 705/14.49 |
| 2011/0203002 | A1 * | 8/2011 | Hwang et al. | 726/26 |
| 2011/0288934 | A1 * | 11/2011 | Douceur et al. | 705/14.53 |
| 2011/0321167 | A1 * | 12/2011 | Wu et al. | 726/26 |
| 2012/0078727 | A1 * | 3/2012 | Lee | 705/14.66 |

FOREIGN PATENT DOCUMENTS

JP 0210079911 A * 4/2010

OTHER PUBLICATIONS

Eric Langford, Neil Schwertman, Margaret Owens, Is the Property of Being Positively Correlated Transitive?, 55:4 Amer. Statistician 322 (Nov. 2001).*
Ana Elisa Castro Sotos, Wim Van den Noortgate, Patrick Oughena, The Non-Transivity of Pearson's Correlation Coefficient: An Educational Perspective, Int'l Stat. Inst. (56th Session 2007).*
William S. Krasker, John W. Pratt, Boudning the Effects of Proxy Variables on Regression Coefficients, 54:3 Econometrica 641-655 (May 1986).*
Kiyoshi Fujikawa, Hikaru Hasegawa, Selection of Proxy Variables (1991), available at https://web.archive.org/web/*/http://www.gsid.nagoya-u.ac.jp/fujikawa/pdf/ronbun09.pdf.*

(Continued)

*Primary Examiner* — Raquel Alvarez
(74) *Attorney, Agent, or Firm* — Fenwick & West LLP

(57) ABSTRACT

A social networking system determines whether targeting criteria for an advertisement includes one or more sensitive criteria. The advertisement's targeting criteria is compared to one or more keywords or parameters associated with sensitive topics, such as sexual orientation, religious affiliation, political affiliation, or health status. If the targeting criteria matches one or more keywords or parameters associated with a sensitive topic, the social networking system determines that the targeting criteria includes sensitive criteria and prevents recordation of information regarding a viewing user's exposure to the advertisement.

23 Claims, 2 Drawing Sheets

(56) References Cited

OTHER PUBLICATIONS

Taylor Phillips, Chris GauthierDickey, Ramki Thurimella, Using Transivity to Increase the Accuracy of Sample-Based Pearson Correlation Coefficients (2010), available at https://web.archive.org/web/*/http://www.cs.du.edu/~chrisg/publications/phillips-dawak10.pdf.*

Coffey, "Internet Audience Measurement: A Practitioner's View," Journal of Interactive Advertising, vol. 1, No. 2, Spring 2001,8 pages. (Year: 2001).*

* cited by examiner

PREVENTING COLLECTION OF SENSITIVE INFORMATION BY ADVERTISERS USING TARGETING CRITERIA

BACKGROUND

This invention relates generally to online advertising, and in particular to preventing collection of sensitive information by advertisers though targeting criteria.

Online advertising has become a profitable business, allowing commercial and private entities to place advertisements on websites and within native applications for presentation to viewing users accessing these websites or applications. Advertisers may anonymously collect and analyze data associated with their viewing users to provide additional advertisements that are more relevant to the viewing users' interests. This may allow advertisers to obtain sensitive information about viewing users.

For example, a problem may arise if an advertiser attempts to target an advertisement to users based on particularly sensitive information, such as political affiliation or sexual orientation. By putting a tracking pixel in the advertisement capable of recording the user's exposure to the advertisement in a cookie, advertisers can track whether the advertisement has been served to the user. This allows advertisers to associate the sensitive information with those users, which may be particularly undesirable where advertisers have personally identifiable information for the users.

SUMMARY

To prevent advertisers from obtaining sensitive information about users using specific targeting criteria, a social networking system determines whether targeting criteria associated with an advertisement for presentation to a viewing user includes sensitive criteria. When the social networking system receives a request for advertising from a viewing user, the social networking system identifies an advertisement for presentation to the viewing user. Targeting criteria associated with the selected advertisement is retrieved, and the social networking system determines whether the targeting criteria associated with the selected advertisement includes criteria determined to be sensitive. For example, the social networking system determines whether the targeting criteria includes criteria based on sexual orientation, religious affiliation, political affiliation, and/or health status. If the targeting criteria includes sensitive criteria the social networking system prevents recordation of information regarding the viewing user's exposure to the advertisement. For example, the social networking system prevents a data collection mechanism from updating files (e.g., cookies) on the viewing user's client device to indicate the viewing user's exposure to the advertisement or prevents a data collection mechanism from directing the viewing user's client device to a landing page associated with the advertisement. In one embodiment, if the social networking system determines that the targeting criteria does not include sensitive criteria, the social networking system allows recordation of information regarding the viewing user's exposure to the advertisement.

By preventing recordation of sensitive information, social networking systems prevent advertisers from collecting certain sensitive information associated with users. As a result, user privacy is enhanced by preventing sensitive information from being captured by advertisers.

Figure 1:
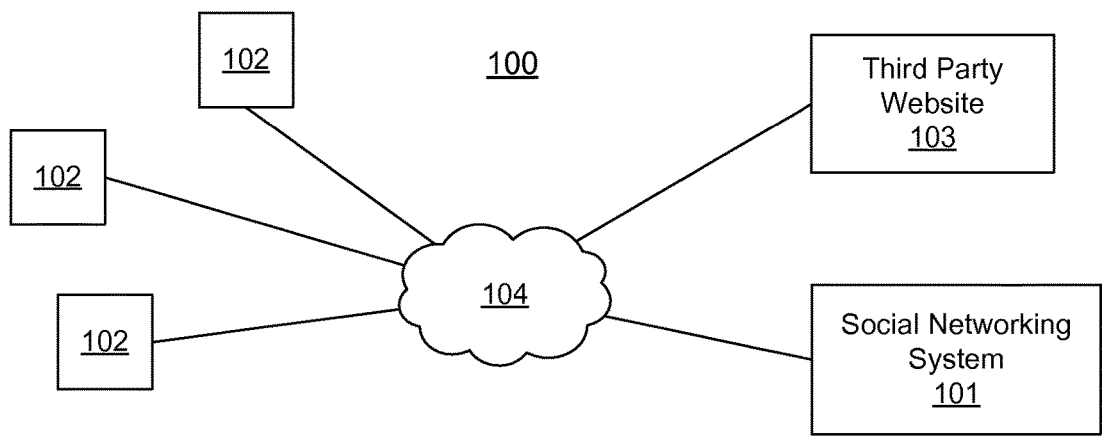
FIG. 1 is a high level block diagram of a system environment suitable for operation of a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Online social networking systems allow users to provide information about themselves in user profiles. For example, social networking systems enable users to input biographic, demographic, and/or other types of descriptive information about the users. Social networking systems additionally enable users to associate themselves and establish connections with other users of the social networking system. When two users become connected, they are said to be "friends," "contacts," "connections," or "associates" within the context of the social networking system. Generally, users connected to each other in a social networking system have access to more information about each other than would be available to unconnected users. Likewise, becoming connected within a social networking system may allow a user greater access to communicate with another user, such as by email (internal and external to the social networking system), instant message, text message, phone, or any other communicative interface. Finally, being connected may allow a user access to view, comment on, download or endorse another user's uploaded content items. Examples of content items include messages, queued messages (e.g., email), text and short message service (SMS) messages, comment messages, messages sent using any other suitable messaging technique, a hypertext transfer protocol (HTTP) link, hypertext markup language (HTML) files, images, videos, audio clips, documents, document edits, calendar entries or events, and other computer-related files.

Users of social networking systems may interact with any object (e.g., an object representing a content item, an object representing a user action, etc.) within the social networking system. This interaction may take a variety of forms, such as by communicating with or commenting on a content item or action object, clicking a button or link associated with approval (such as a "like" button), sharing a content item or user action with other users, downloading or merely viewing a content item, or any other suitable form of interaction. Users of social networking systems may also interact with other users by establishing a connection with them, by viewing their profile, by communicating with them, or by being connected to common objects or users within the social networking system. Further, a user of a social networking system may form or join groups, or may become a fan of a fan page.

A social networking system user may also interact with content items, websites, other users or other information outside of the context of the social networking system that are connected to or associated with the social networking system. For instance, an article on a news web site might have a "like" button that users of the social networking system may access to express approval of the article. Likewise, a company's website may provide the ability to join a social networking system group dedicated to the company directly from the company's website.

In some implementations, a social networking system selects and displays advertisements to one or more viewing users. Advertisements may be selected based on specific targeting criteria associated with various advertisements. Thus, an advertisement may be selected for a viewing user if demographic or other attributes of the viewing user satisfy one or more of the advertisement's targeting criteria. The demographic or other attributes of the viewing user may be determined based on the user profile of the viewing user and/or the interactions performed by the viewing user within the social networking system. Some advertisements provided to viewing users may include data collection mechanisms, such as view tags (e.g., links indicating server redirects to specific universal resource locators). In various embodiments, an individual data collection mechanism comprises instructions that, when executed by a client device, cause the client device to perform an action that can be recorded. For example, a data collection mechanism may update a cookie stored on a client device of the viewing user. The cookie stores information anonymously indicating the viewing user has been exposed to an advertisement. For example, a cookie stored on the client device of a viewing user is updated by the data collection mechanism to include an identifier for the advertisement presented to the user, the time and date of the presentation, and may include additional information.

In one embodiment prior to providing an advertisement to a viewing user, a social networking system determines whether targeting criteria associated with the advertisement includes sensitive criteria. For example, the social networking system stores a listing identifying sensitive criteria. During operation, the social networking system selects an advertisement to be provided to a viewing user. The social networking system determines whether targeting criteria for the selected advertisement targets users based on sexual orientation, religious affiliation, political affiliation and/or health status using the listing. If one or more sensitive criteria are included in the advertisement's targeting criteria, the social networking system prevents a data collection mechanism associated with the advertisement from recording the viewing user's exposure to the advertisement. For example, the data collection mechanism associated with the advertisement is disabled. If the targeting criteria does not include sensitive criteria, the advertisement's data collection mechanism is enabled to record the viewing user's exposure to the advertisement.

System Architecture

FIG. 1 is a high level block diagram illustrating a system environment 100 for operation of a social networking system 101. The system environment 100 includes one or more client devices 102, one or more third-party websites 103, the social networking system 101, and a network 104. While FIG. 1 shows three client devices 102 and a single third-party website 103, any number of these entities (including millions) may be included. In alternative configurations, different and/or additional entities may be included in the system environment 100.

The client devices 102 include one or more computing devices capable of receiving user input as well as transmitting and/or receiving data via the network 104. For example, the client devices 102 may be desktop computers, laptop computers, tablet computers (pads), smart phones, personal digital assistants (PDAs), or any other device including computing functionality and data communication capabilities. The client devices 102 are configured to communicate via the network 104. The client devices 102 allow various users can communicate with the social networking system 101.

The network 104 may be any wired or wireless local area network (LAN) and/or wide area network (WAN), such as an intranet, an extranet, or the Internet. The network 104 provides communication capabilities between one or more client devices 102, one or more third-party websites 103, and the social networking system 101. In various embodiments the network 104 may use standard communication technologies and/or protocols. Examples of technology used by the network 104 include Ethernet, 802.11, 3G, 4G, 802.16, or any other suitable communication technology. Examples of protocols that may be used by the network 104 include transmission control protocol/Internet protocol (TCP/IP), hypertext transport protocol (HTTP), simple mail transfer protocol (SMTP), file transfer protocol (TCP), or any other suitable communication protocol. The third party website 103 is coupled to the network 104 in order to communicate with the social networking system 101.

The social networking system 101, further described below in conjunction with FIG. 2, includes a computing system that allows users to communicate or otherwise interact with each other and access content as described herein. In one embodiment, the social networking system 101 stores user profiles describing users of a social network, including biographic, demographic, and other types of descriptive information, such as work experience, educational history, hobbies or preferences, location, and the like. The social networking system 101 additionally stores other objects, such as fan pages, events, groups, advertisements, general postings, etc.

Figure 2:
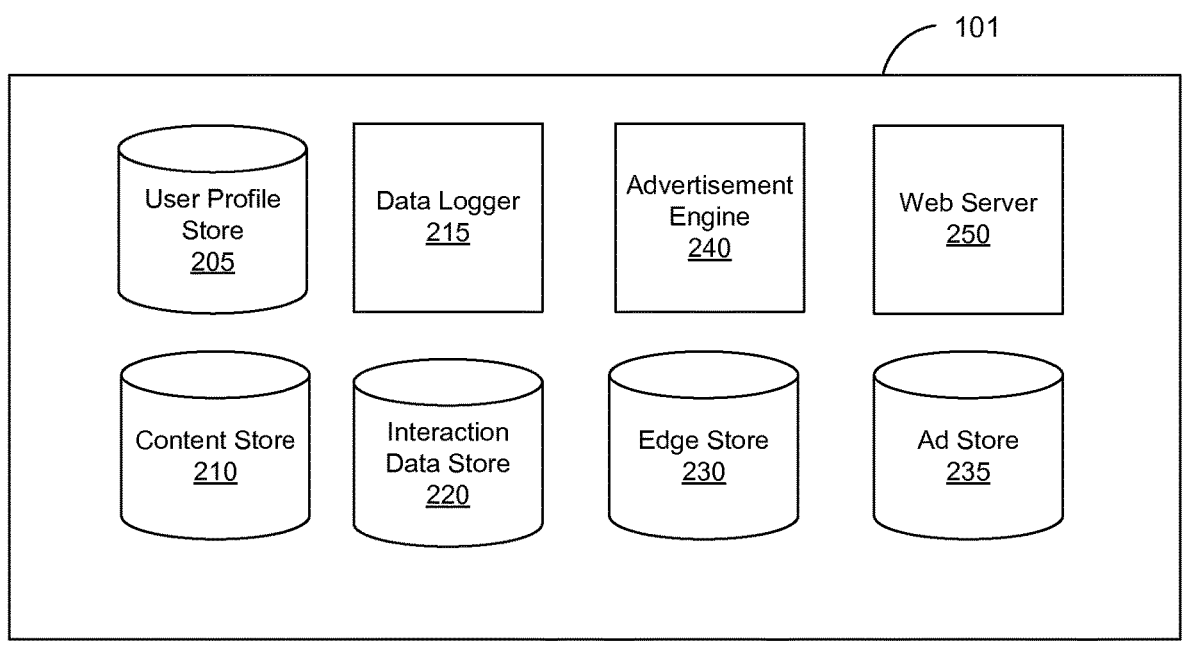
FIG. 2 is a block diagram of various components of a social networking system, in accordance with an embodiment of the invention.

FIG. 2 is an example block diagram of various components of the social networking system 101. In alternative configurations, different components can be included in the social networking system 101.

Each user of the social networking system 101 is associated with a user profile, which is stored in the user profile store 205. A user profile includes declarative information about the user that was explicitly shared by the user, and may also include profile information inferred by the social networking system 101. In one embodiment, a user profile includes multiple data fields, each data field describing one or more attributes of the corresponding user of the social networking system 101. The user profile information stored in user profile store 205 describes the users of the social networking system 101, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 101 displayed in an image. A user profile in the user profile store 205 may also maintain references to actions by the corresponding user performed on content items in the content store 210 and stored in the interaction data store 220.

While user profiles in the user profile store 205 are frequently associated with individuals, allowing people to interact with each other via the social networking system 101, user profiles may also be stored for entities such as businesses or organizations. This allows an entity to establish a presence on the social networking system 101 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores content items associated with a user profile, such as images, videos and audio files. Content items from the content store 210 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system 101 by displaying content related to users, objects, activities, or functionalities of the social networking system 101. Examples of social networking content items include suggested connections or suggestions to perform other actions, media provided to, or maintained by, the social networking system 101 (e.g., pictures or videos), status messages or links posted by users to the social networking system, events, groups, pages (e.g., representing an organization or commercial entity), and any other content provided by or accessible via the social networking system.

The data logger 215 receives communications about user actions on and/or off the social networking system 101, populating the interaction data store 220 with information about user actions. Such actions may include, for example, adding a connection to another user, sending a message to another user, uploading an image, reading a message from another user, viewing content associated with another user, attending an event posted by another user, among others. In some embodiments, the data logger 215 identifies interaction between a social networking system user and a brand page within the social networking system 101. In addition, a number of actions described in connection with other objects are directed at particular users, so these actions are associated with those users as well. These actions are stored in the interaction data store 220.

The interaction data store 220 may be used by the social networking system 101 to track user actions on the social networking system 101, as well as external websites that communicate information to the social networking system 101. Users may interact with various objects on the social networking system 101, including commenting on posts, sharing links, and checking-in to physical locations via a mobile device, accessing content items in a sequence or other interactions. Information describing these actions is stored in the interaction data store 220. Additional examples of interactions with objects on the social networking system 101 included in the interaction data store 220 include commenting on a photo album, communications between users, becoming a fan of a musician, adding an event to a calendar, joining a groups, becoming a fan of a brand page, creating an event, authorizing an application, using an application and engaging in a transaction. Additionally, the interaction data store 220 records a user's interactions with advertisements on the social networking system 101 as well as other applications operating on the social networking system 101. In some embodiments, data from the interaction data store 220 is used to infer interests or preferences of the user, augmenting the interests included in the user profile and allowing a more complete understanding of user preferences.

The interaction data store 220 may also store user actions taken on external websites. For example, an e-commerce website that primarily sells sporting equipment at bargain prices may recognize a user of a social networking system 101 through social plug-ins that enable the e-commerce website to identify the user of the social networking system 101. Because users of the social networking system 101 are uniquely identifiable, e-commerce websites, such as this sporting equipment retailer, may use the information about these users as they visit their websites. The interaction data store 220 records data about these users, including webpage viewing histories, advertisements that were engaged, purchases made, and other patterns from shopping and buying.

The web server 250 links the social networking system 101 via the network 104 to one or more of the client devices 102, as well as to one or more third party websites 103. The web server 250 may include a mail server or other messaging functionality for receiving and routing messages between the social networking system 101 and the client devices 102 or third party websites 103. The messages may be instant messages, queued messages (e.g., email), text and SMS messages, or any other suitable messaging technique. In one embodiment, the web server 250 receives user requests for content, where an advertisement is to be provided with the content, and sends a request for an advertisement to the advertisement engine 240. Similarly, the web server 250 may receive a request for an advertisement and send the request to the advertisement engine 240 to identify an advertisement. In some embodiments, the web server 250 includes advertisements and sends advertisements to a viewing user responsive to a user request for content or responsive to a request for an advertisement.

The data logger 260 receives communications from the web server 250 describing different interactions between users and a number of different types of social networking objects in the social networking system 101.

In one embodiment, an edge store 230 stores the information describing connections between users and other objects on the social networking system 101 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 101, such as expressing interest in a page on the social networking system, sharing a link with other users of the social networking system, and commenting on posts made by other users of the social networking system. The edge store 230 stores edge objects that include information about the edge, such as affinity scores for objects, interests, and other users. Affinity scores may be computed by the social networking system 101 over time to approximate a user's affinity for an object, interest, and other users in the social networking system 101 based on the actions performed by the user. Multiple interactions between a user and a specific object may be stored in one edge object in the edge store 230, in one embodiment. In some embodiments, connections between users may be stored in the user profile store 205, or the user profile store 205 may access the edge store 230 to determine connections between users.

In one embodiment, the social networking system 101 stores advertisements in an advertisement ("ad") store 235. Advertisements are retrieved from the ad store 235 for presentation to social networking system users. In one embodiment, when an advertisement is received from an advertiser, an advertisement data structure is generated and stored in the ad store 235. The advertisement data structure includes a unique identifier associated with the advertisement, targeting criteria associated with the advertisement, data collection mechanisms associated with the advertisement, content presented via the advertisement, or other suitable information.

The advertisement engine 240 selects advertisements for presentation to a viewing user from the ad store 235 and prevents the recording of sensitive information by data collection mechanisms associated with advertisements. In one embodiment, the advertising engine 240 determines whether an advertisement selected for presentation to a viewing user includes sensitive criteria in its targeting criteria. Examples of sensitive criteria include criteria related to sexual orientation, religious affiliation, political affiliation, and/or health status. In one embodiment, the advertisement engine 240 includes a listing of sensitive criteria. Targeting criteria associated with an advertisement is compared to this listing of sensitive criteria to determine whether the targeting criteria includes data or data types that the social networking system 101 classifies as sensitive. If targeting criteria associated with an advertisement includes sensitive criteria, the advertisement engine 240 disables data collection mechanisms associated with the advertisement to prevent recordation of information about the viewing user's exposure to the advertisement.

Process for Preventing the Collection of Sensitive Information

Figure 3:
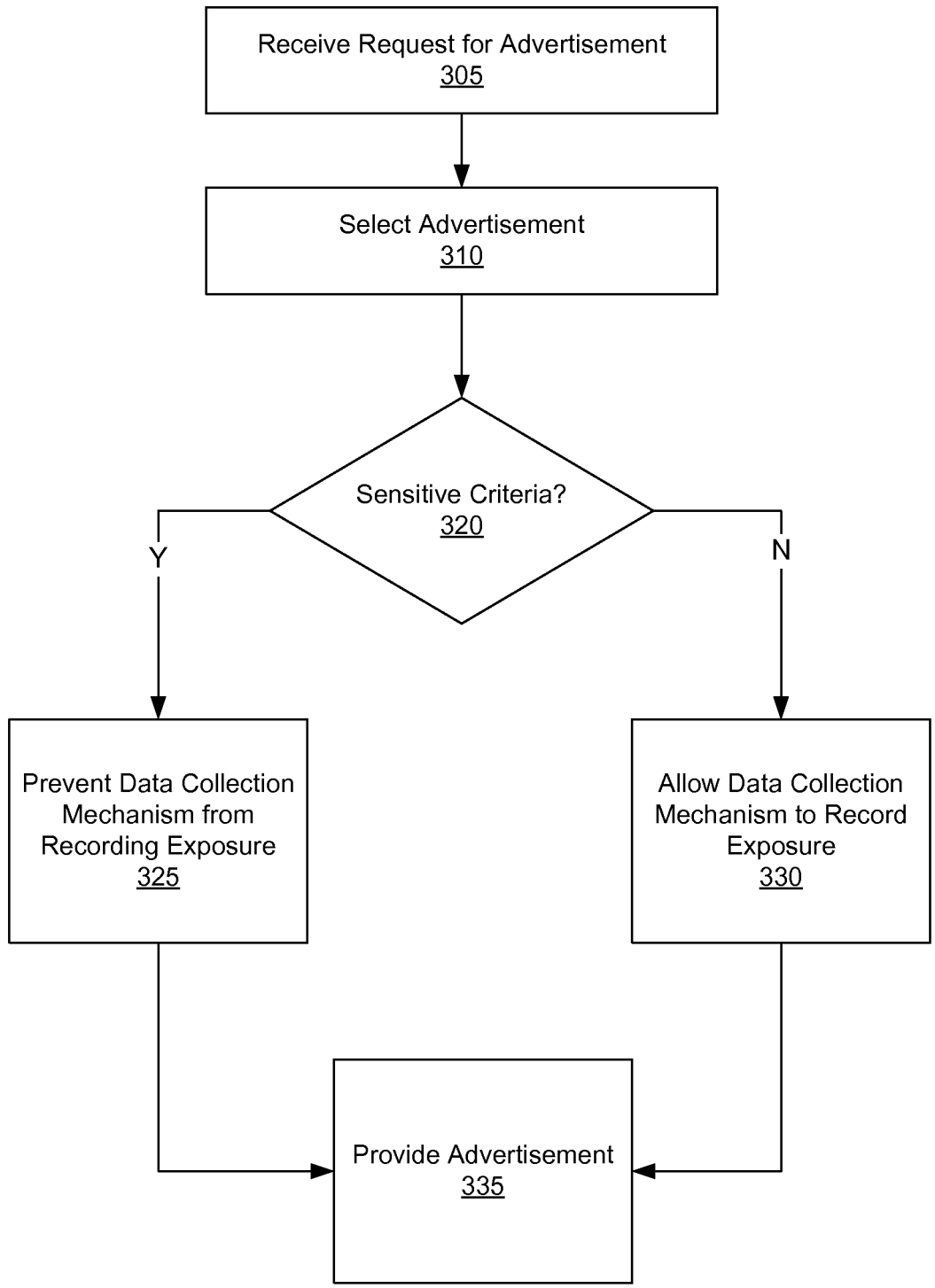
FIG. 3 is a flow chart of a process for preventing collection of sensitive information, in accordance with an embodiment of the invention.

FIG. 3 illustrates one embodiment of a process 300 for preventing collection of sensitive information about a social networking system user. The process 300 may be performed by any suitable component of the social networking system 101, such as the advertisement engine 240. In one embodiment, the advertisement engine 240 receives 305 a request for content including an advertisement, or receives a request for an advertisement from a viewing user of the social networking system 101. For example, a viewing user requests a particular page maintained by the social networking system 101, such as a user profile page, a fan page, a newsfeed page, etc. The requested page may specify display of one or more advertisements as well as the page content.

Based on the received request, the advertisement engine 240 selects 310 an advertisement for presentation to the viewing user. In one embodiment, the advertisement is selected 310 from a set of candidate advertisements retrieved from the ad store 235 or from another suitable source of advertisements. The candidate advertisements may have been previously received from various third party advertisers and/or other suitable entities.

In selecting an advertisement, the advertisement engine 240 considers the targeting criteria for each candidate advertisement and may consider other suitable factors. A candidate advertisement's targeting criteria specifies certain characteristics or attributes for a viewing user to satisfy to be eligible to be presented with the candidate advertisement. Hence, the advertisement engine 240 may not select an advertisement unless the viewing user meets one or more of the advertisement's targeting criteria.

For example, an advertisement's targeting criteria specifies that the advertisement is only presented to users having certain demographic characteristics, such as being within a certain age range, having certain stated interests, etc. The advertisement's targeting criteria may additionally or alternatively limit presentation of the advertisement to users associated with certain social signals, such as based on certain user social network connections, online actions, etc. For instance, an advertisement's targeting criteria may limit presentation of the advertisement to viewing users that previously "liked" or "joined" a fan page for a product promoted by the advertisement over the social networking system. Accordingly, the advertisement engine 240 selects 310 an advertisement associated with targeting criteria satisfied by the viewing user.

The advertisement engine 240 may determine whether the viewing user meets an advertisement's targeting criteria in any suitable manner. In one embodiment, the advertisement engine 240 compares the targeting criteria to information in the viewing user's user profile. For example, an advertisement may be targeted to viewing users affiliated with a particular political party. The advertisement engine 240 may analyze the viewing user's user profile in order to determine whether the user is associated with the political party. The advertisement engine 240 may also determine whether the viewing user satisfies the advertisement's targeting criteria by evaluating various actions or interactions performed by the viewing user and logged by the social networking system 101. For example, the advertisement engine 240 compares data in the interaction data store 220 describing the viewing user's actions with the advertisement's targeting criteria. As a specific example, an advertisement may be targeted to viewing users having a certain health condition. The advertisement engine 240 may determine that the viewing user satisfies the advertisement's targeting criteria because the viewing user previously joined a fan page associated with the health condition. The advertisement engine 240 may additionally use the viewing user's connections to other users to determine whether the viewing user satisfies an advertisement's targeting criteria. For example, an advertisement may be targeted to viewing users having friends that purchased a particular product. The advertisement engine 240 may determine that the viewing user satisfies the advertisement's targeting criteria because a threshold number of the viewing user's friends have purchased the same product.

In addition to selecting an advertisement based on target criteria, the advertisement engine 240 also considers bids associated with candidate advertisements. Other information associated with the candidate advertisements may also be used, such as the popularity of each advertisement in the set of advertisements, the number of users who have been provided with each advertisement, or other suitable information. For example, the advertisement engine 240 selects 310 an advertisement associated with the highest bid from an advertiser relative to other advertisements. As another example, the advertisement engine 240 selects 310 an advertisement having previously been presented to the fewest number of users.

After selecting an advertisement from the set of candidate advertisements, the advertisement engine 240 determines 320 whether the targeting criteria includes sensitive criteria. For example, the advertisement engine 240 determines 320 whether the targeting criteria identifies viewing users based at least in part on the viewing user's sexual orientation, religious affiliation, political affiliation, and/or health status.

The advertisement engine 240 determines 320 whether the targeting criteria includes sensitive criteria in any suitable manner.

In one embodiment, the advertisement engine 240 analyzes terms specifying particular categories or groups of users to which the advertisement is targeted ("targeting terms") and/or other parameters of the targeting criteria in order to determine 320 whether sensitive criteria is included in the targeting criteria. For example, the advertisement engine 240 compares the targeting terms and/or other parameters included in the targeting criteria to a listing of keywords or terms stored in the advertisement engine 240 and associated with sensitive topics. The advertisement engine 240 determines 320 the targeting criteria includes sensitive criteria if the targeting criteria includes targeting terms or other parameters matching, or related to, the stored listing of keywords or terms associated with sensitive topics. For example, the advertisement engine 240 determines an advertisement's targeting criteria includes terms matching the stored keywords "Republican" and "Democrat," so the advertisement engine 240 determines 320 the targeting criteria includes sensitive criteria.

Alternatively, the advertisement engine 240 evaluates various social signals in order to determine whether the targeting criteria includes sensitive criteria. In one embodiment, the advertisement engine 240 evaluates user profile information, interactions and/or other information associated with those users that were previously exposed to or presented with the selected advertisement to determine 320 whether the targeting criteria includes sensitive criteria. In particular, the advertisement engine 240 determines whether all or a threshold percentage/number of users that were previously exposed to the selected advertisement are each associated with a sensitive common characteristic based on the users' user profiles and/or interactions. If all or a threshold percentage/number of users are associated with such a common characteristic, the advertisement engine 240 determines that the targeting criteria for the advertisement includes sensitive criteria. In this way, the advertisement engine 240 can determine instances where targeting criteria includes sensitive criteria even where the targeting criteria does not explicitly specify known sensitive terms or parameters.

For example, an advertisement may have targeting criteria that does not specifically mention the keyword "Democrats." However, analysis of the user profiles of the users previously presented with the advertisement may indicate that all or a high percentage of the users have explicitly or implicitly identified themselves as Democrats. As a result, the advertisement engine 240 determines 320 that the advertisement's targeting criteria includes sensitive targeting criteria. As another example, an advertisement may have targeting criteria that does not specifically mention the keyword "Republican." However, analysis of the user actions of the users previously presented with the advertisement may indicate that all or a high number of the users have previously joined a group related to the Republican party. As a result, the advertisement engine 240 determines 320 that the advertisement's targeting criteria includes sensitive targeting criteria.

In another embodiment, the advertisement engine 240 determines 320 whether an advertisement's targeting criteria includes sensitive criteria by applying one or more supervised machine learning techniques to the targeting criteria. For example, the advertisement engine 240 is trained by a system operator, or other suitable entity by providing the advertisement engine 240 with a set of training targeting criteria. The system operator may also provide the advertisement engine 240 with data indicating whether items of targeting criteria in the set are sensitive. Using the training set and provided data, the advertisement engine 240 may generate classifiers for recognizing sensitive targeting criteria based on Bayesian decision techniques.

Responsive to determining 320 the targeting criteria includes sensitive criteria, the advertisement engine 240 prevents 325 a data collection mechanism of the selected advertisement from logging information about the viewing user. Any suitable method may be used to prevent 325 the selected advertisement's data collection mechanism from logging information.

In one embodiment, the advertisement engine 240 removes the data collection mechanism from the advertisement before providing the advertisement to the viewing user. For example, the advertisement engine 240 removes a view tag embedded in or otherwise associated with the selected advertisement. Removing the view tag or other data collection mechanism associated with the selected advertisement prevents generation or modification of a cookie on the viewing user's client device when the selected advertisement is presented to the viewing user. This prevents logging information indicating the viewing user's exposure to the advertisement from being recorded. The advertisement engine 240 may also prevent any action to be taken by an advertiser that could be correlated with a user's presentation of an advertisement. For example, the advertisement engine 240 may prevent usage of landing pages associated with the selected advertisement by disabling or removing a link to a landing page included in a selected advertisement.

In another embodiment, the advertisement engine 240 provides an indication to the viewing user's client device that a data collection mechanism associated with the selected advertisement should be disabled or removed. For example, the advertisement engine 240 transmits a flag to a web browser executed on the client device of the viewing user. Based on receipt of the flag, the web browser does not execute code associated with the data collection mechanism.

If it is determined 320 that the targeting criteria does not include sensitive targeting criteria, the advertisement engine 240 allows 330 the data collection mechanism of the selected advertisement to log information about the viewing user. For example, the selected advertisement's data collection mechanism is permitted to generate and/or update a cookie stored on the viewing user's client device when the selected advertisement is presented to the viewing user. The cookie may be modified to include an entry specifying the viewing user has been exposed to the selected advertisement.

After determining 320 whether the selected advertisement's targeting criteria includes sensitive criteria and configuring operation of the selected advertisement's data collection mechanism accordingly, the selected advertisements sends 335 the advertisement to the client device used by the viewing user. In one embodiment, the advertisement is presented to the viewing user in conjunction with other content.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
  using a computer processor to perform steps comprising:
    receiving a request for an advertisement from a viewing user;
    selecting an advertisement to provide to the viewing user based on targeting criteria associated with the advertisement, the advertisement associated with a data collection mechanism including instructions for causing a client device of the viewing user to perform an action that can be recorded;
    identifying a plurality of users of a social networking system who were previously exposed to the selected advertisement;
    evaluating a plurality of social signals associated with a threshold number of the plurality of users of the social networking system who were previously exposed to the selected advertisement;
    determining, based on the evaluated social signals, whether the threshold number of the plurality of users who were previously exposed to the selected advertisement are associated with a common characteristic relating to a sensitive topic, the sensitive topic including at least one of sexual orientation related-criteria, religious affiliation related-criteria, or political affiliation related-criteria;
    responsive to determining that the threshold number of the plurality of users are associated with the common characteristic relating to the sensitive topic, determining that the targeting criteria associated with the selected advertisement include information associated with the sensitive topic even though the targeting criteria did not explicitly specify terms of the sensitive topic;
    preventing the instructions of the data collection mechanism from causing the client device of the viewing user to perform an action that can be recorded; and
    sending the selected advertisement for display to the client device associated with the viewing user.

2. The computer-implemented method of claim 1, wherein the common characteristic is selected from a group consisting of: a sexual orientation, a religious affiliation and a political affiliation.

3. The computer-implemented method of claim 1, wherein the action is at least one of a group consisting of: visiting a web page adapted to track presentation of the selected advertisement to the viewing user and storing a data file on the client device indicating that the selected advertisement was presented to the viewing user.

4. The method of claim 1, wherein the plurality of social signals include information included in user profiles of the plurality of users.

5. The method of claim 1, wherein the plurality of social signals include social interactions between the plurality of users and other entities in the social networking system.

6. The method of claim 1, wherein preventing the instructions of the data collection mechanism from causing the client device of the viewing user to perform an action that can be recorded comprises removing the data collection mechanism from the selected advertisement before sending the selected advertisement for display.

7. The method of claim 1, wherein the plurality of social signals include one or more user actions performed by one or more additional viewing users on objects maintained by the social networking system.

8. The method of claim 1, wherein the plurality of social signals include one or more connections between the viewing user and additional viewing users of the social networking system.

9. A computer-implemented method comprising:
  using a computer processor to perform steps comprising:
    receiving a request for an advertisement;
    selecting an advertisement to serve to a viewing user based on targeting criteria associated with the advertisement and information associated with the viewing user stored by a social networking system, the advertisement associated with a data collection mechanism for logging information about the viewing user;

identifying a plurality of users of the social networking system who were previously exposed to the selected advertisement;

evaluating a plurality of social signals associated with a threshold number of the plurality of users of the social networking system who were previously exposed to the selected advertisement;

determining, based on the evaluated social signals, whether the threshold number the plurality of users who were previously exposed to the selected advertisement are associated with a common characteristic relating to a sensitive topic;

responsive to determining that the threshold number the plurality of users are associated with the common characteristic relating to the sensitive topic, determining that the targeting criteria associated with the selected advertisement include information associated with the sensitive topic even though the targeting criteria did not explicitly specify terms of the sensitive topic, the sensitive topic including at least one of: sexual orientation related-criteria, religious affiliation related-criteria, or political affiliation related-criteria;

preventing the data collection mechanism associated with the selected advertisement from logging information about the viewing user; and sending the selected advertisement for display to a client device associated with the viewing user.

10. The computer-implemented method of claim 9, wherein the data collection mechanism is configured to log information regarding the viewing user by generating an entry in a cookie stored on the client device associated with the viewing user.

11. The computer-implemented method of claim 10, wherein the entry in the cookie indicates that the viewing user has been exposed to the advertisement.

12. The computer-implemented method of claim 9, wherein the data collection mechanism is a view tag.

13. The computer-implemented method of claim 9, wherein selecting the advertisement to serve to the viewing user based on the targeting criteria associated with the advertisement and information associated with the viewing user stored by a social networking system comprises:

determining whether the targeting criteria are satisfied by information included in a user profile for the viewing user maintained by the social networking system; and responsive to a determination that the targeting criteria are satisfied, selecting an advertisement associated with the targeting criteria.

14. The computer-implemented method of claim 9, wherein selecting the advertisement to serve to the viewing user based on the targeting criteria associated with the advertisement and information associated with the viewing user stored by a social networking system comprises:

selecting an advertisement associated with the targeting criteria satisfied by one or more connections of the viewing user in the social networking system.

15. The computer-implemented method of claim 9, wherein selecting the advertisement to serve to the viewing user based on the targeting criteria associated with the advertisement and information associated with the viewing user stored by a social networking system comprises:

selecting an advertisement associated with the targeting criteria satisfied by one or more observed actions of the viewing user in the social networking system.

16. The method of claim 9, wherein the plurality of social signals include information included in user profiles of the plurality of users.

17. The method of claim 9, wherein the plurality of social signals include social interactions between the plurality of users and other entities in the social networking system.

18. The method of claim 9, wherein preventing the instructions of the data collection mechanism from causing the client device of the viewing user to perform an action that can be recorded comprises removing the data collection mechanism from the selected advertisement before sending the selected advertisement for display.

19. A computer-implemented method comprising:

using a computer processor to perform steps comprising:
    selecting an advertisement to serve to a viewing user based on targeting criteria associated with the advertisement;
    identifying a plurality of users of a social networking system who were previously exposed to the selected advertisement;
    evaluating a plurality of social signals associated with a threshold number of the plurality of users of the social networking system who were previously exposed to the selected advertisement;
    determining, based on the evaluated social signals, whether the threshold number the plurality of users who were previously exposed to the selected advertisement are associated with a common characteristic relating to a sensitive topic, the sensitive topic including at least one of sexual orientation related-criteria, religious affiliation related-criteria, or political affiliation related-criteria;
    responsive to determining that the threshold number of the plurality of users are associated with a common characteristic relating to the sensitive topic, determining that the targeting criteria associated with the selected advertisement include information associated with the sensitive topic even though the targeting criteria did not explicitly specify terms of the sensitive topic;
    preventing a data collection mechanism associated with the advertisement from logging information to a data file associated with the viewing user; and
    providing the selected advertisement to a client device associated with the viewing user.

20. The computer-implemented method of claim 19, wherein the common characteristic is selected from a group comprising: a sexual orientation, a religious affiliation and a political affiliation.

21. The computer-implemented method of claim 18, wherein the data file is a cookie locally stored on the client device associated with the viewing user.

22. The method of claim 19, wherein the plurality of social signals include information included in user profiles of the plurality of users.

23. The method of claim 19, wherein the plurality of social signals include social interactions between the plurality of users and other entities in the social networking system.

* * * * *